United States Patent
Kremo et al.

(10) Patent No.: US 10,098,175 B2
(45) Date of Patent: Oct. 9, 2018

(54) WIRELESS COMMUNICATION APPARATUS AND WIRELESS COMMUNICATION METHOD

(71) Applicant: TOYOTA JIDOSHA KABUSHIKI KAISHA, Toyota-shi, Aichi-ken (JP)

(72) Inventors: Haris Kremo, Dublin (IE); Onur Altintas, Sunnyvale, CA (US); Matthias Stephan Wilhelm, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/639,595

(22) Filed: Jun. 30, 2017

(65) Prior Publication Data

US 2018/0042066 A1 Feb. 8, 2018

(30) Foreign Application Priority Data

Aug. 4, 2016 (JP) ................. 2016-154027

(51) Int. Cl.
*H04W 72/04* (2009.01)
*H04W 76/25* (2018.01)
(Continued)

(52) U.S. Cl.
CPC ............. *H04W 76/25* (2018.02); *G01S 13/42* (2013.01); *G01S 13/86* (2013.01); *G01S 13/931* (2013.01);
(Continued)

(58) Field of Classification Search
CPC .......... G01S 13/04; G01S 13/72; G01S 13/93; B60W 30/095; B60W 40/04; B60R 21/01; G08G 1/166; G06K 9/00805
(Continued)

(56) References Cited

U.S. PATENT DOCUMENTS

| | | | |
|---|---|---|---|
| 2008/0300787 A1* | 12/2008 | Zeng | G01S 7/4026 701/301 |
| 2014/0035774 A1* | 2/2014 | Khlifi | G01S 7/006 342/21 |
| 2014/0362823 A1 | 12/2014 | Funabashi et al. | |

FOREIGN PATENT DOCUMENTS

| | | |
|---|---|---|
| JP | H07-322352 A | 12/1995 |
| JP | 2003-058995 A | 2/2003 |

(Continued)

OTHER PUBLICATIONS

Christian Sturm et al., "Waveform Design and Signal Processing Aspects for Fusion of Wireless Communications and Radar Sensing", Procedings of the IEEE 99.7 (2011), pp. 1236-1259.

(Continued)

*Primary Examiner* — Phuoc H Doan
(74) *Attorney, Agent, or Firm* — Oliff PLC

(57) ABSTRACT

A wireless communication apparatus includes a radar device; a communication device configured to communicate using at least a part of a frequency band that is used by the radar device; an acquirer configured to acquire a position of a target object using the radar device; a predictor configured to predict a trajectory of the target object from history of positions of the target object; and a controller configured to determine a communication start time with the target object based on a communication range of the communication device and the trajectory of the target object, and control the communication device so that data is transmitted to the target object at the determined communication start time using the communication device.

11 Claims, 6 Drawing Sheets

(51) Int. Cl.
*G01S 13/42* (2006.01)
*G01S 13/86* (2006.01)
*G01S 13/93* (2006.01)
*H04W 24/08* (2009.01)
*H04W 72/12* (2009.01)
*H04W 4/46* (2018.01)
*H04W 4/80* (2018.01)
*H04W 84/12* (2009.01)
*H04W 88/02* (2009.01)

(52) U.S. Cl.
CPC ............ *H04W 4/46* (2018.02); *H04W 24/08* (2013.01); *H04W 72/0453* (2013.01); *H04W 72/12* (2013.01); *H04W 4/80* (2018.02); *H04W 84/12* (2013.01); *H04W 88/02* (2013.01)

(58) Field of Classification Search
USPC ................ 455/450; 701/24, 117; 342/457
See application file for complete search history.

(56) References Cited

FOREIGN PATENT DOCUMENTS

| | | |
|---|---|---|
| JP | 2014-239312 A | 12/2014 |
| JP | 2016-019151 A | 2/2016 |
| WO | 2012/037680 A1 | 3/2012 |

OTHER PUBLICATIONS

Jaber Moghaddasi et al., "Improved Joint Radar-Radio (RadCom) Transceiver for Future Intelligent Transportation Platforms and Highly Mobile High-Speed Communication Systems", Wireless Symposium (IWS) 2013 IEEE International, IEEE, 2013).

* cited by examiner

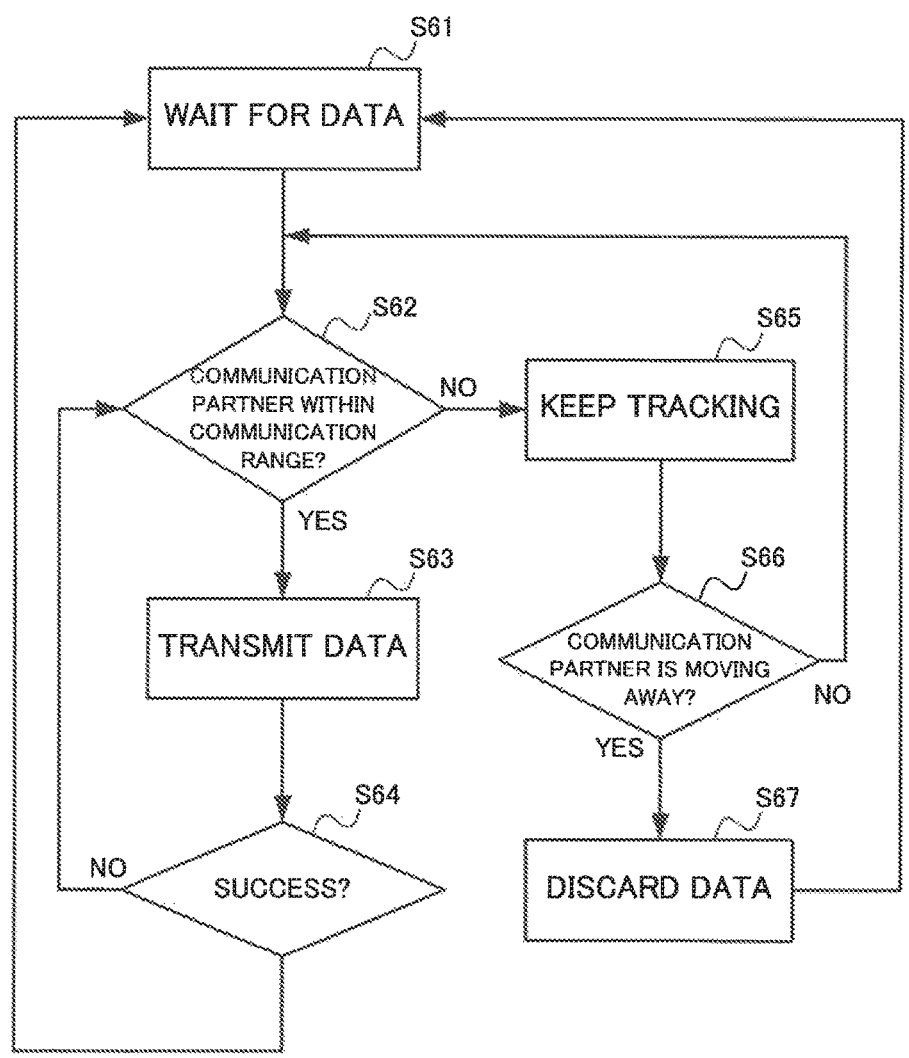

WIRELESS COMMUNICATION APPARATUS AND WIRELESS COMMUNICATION METHOD

CROSS-REFERENCE TO RELATED APPLICATION

This application claims the benefit of Japanese Patent Application No. 2016-154027, filed on Aug. 4, 2016, which is hereby incorporated by reference herein in its entirety.

BACKGROUND OF THE INVENTION

Field of the Invention

The present invention relates to a wireless communication apparatus, and more particularly to communication control in a wireless communication apparatus configured to perform wireless communication using the same frequency band as a radar device.

Description of the Related Art

Recently various radar devices are used on vehicles for adaptive cruise control (ACC), emergency braking assistance, autonomous driving and the like. Further, it has also been proposed to perform both detection of a target object and wireless communication with the target object using a radar device (WO 2012/037680; US Patent Publication No. 2014-0035774; Sturm, Christian and Werner Wiesbeck: "Waveform design and signal processing aspects for fusion of wireless communications and radar sensing", Proceedings of the IEEE 99.7 (2011), 1236-1259; Moghaddasi, Jaber and Ice Wu: "Improved joint radar-radio (RadCom) transceiver for future intelligent transportation platforms and highly mobile high-speed communication systems," Wireless Symposium (IWS) 2013 IEEE International, IEEE, 2013).

The spatial resolution of a radar is in inverse proportion to an occupied bandwidth of a transmission wave ($\Delta x = c/B$, B: bandwidth; c: speed of light). If it is assumed that the radar is used on a vehicle, a several hundred MHz to a several GHz bandwidth is required to detect roadway objects, and high frequency matching with this bandwidth is necessary. Currently the frequency of radar normally used for a vehicle is 10 GHz or more. Particularly, a radar system that can detect a pedestrian, a small animal or an object using 4 GHz bandwidth in the 79 GHz band has been proposed.

Such a high frequency radio wave has strong linear advancement properties, hence it is not easy to establish and maintain a communication connection at the same time with radar detection. It is even more difficult to establish and maintain a communication connection if the wireless communication apparatus is installed in a moving body, such as a vehicle, since the mutual positional relationship changes constantly.

SUMMARY OF THE INVENTION

With the foregoing problems in view, an aspect of the present invention may be configured so that a communication connection is appropriately established and maintained when wireless communication is performed using the same frequency band as a radar device.

A first aspect of the present invention may be a wireless communication apparatus having: a radar device; a communication device configured to communicate using at least a part of a frequency band that is used by the radar device; an acquirer configured to acquire a position of a target object using the radar device; a predictor configured to predict a trajectory of the target object from history of positions of the target object; and a controller configured to control the communication device so that a communication start time with the target object is determined based on the communication range of the communication device and the trajectory of the target object, and data is transmitted to the target object at the determined communication start time using the communication device.

Since the trajectory can be predicted from the history of the positions of the target object (communication partner) acquired from the radar device, it can be recognized when the communication partner exists within a communication range of the communication device. In other words, if communication is started at a timing when the trajectory of the communication partner enters the communication range, the communication partner can receive the information, and if communication is stopped at a timing when the trajectory of the communication partner exits the communication range, transmission can be limited to the period when the communication partner can receive the information.

In this aspect, the wireless communication apparatus may include a plurality of communication device having different communication ranges from one another. In this case, the communication control apparatus can determine the period when the communication is performed and the communication device to be used for the communication. For instance, the wireless communication apparatus may determine and use a communication device that a communication partner is predicted to enter the communication range. If the communication partner enters communication ranges of a plurality of communication devices, the apparatus may determine a communication device to be used based on the communicable time or the data volume that can be transmitted during the communicable time.

The predictor according to this aspect may determine the trajectory of the target object by a Kalman filter, regressive processing to approximate a curved line or the like. In this case, the trajectory of the target object may be expressed by a relative position with respect to this wireless communication apparatus. The trajectory of the relative position of the target object may be predicted by predicting the trajectories of the target object and the wireless communication apparatus using absolute positions, or the trajectory of the relative position of the target object may be predicted from the history of the relative positions of the target object.

The communication range of the communication device may be provided in advance as design information, or may be determined in advance by actual measurement. If the radar device and the communication device are integrated, the communication range may be determined based on the history of the detection results by the radar device.

The communication range of the communication device can be defined as an area in which the field intensity of the radio wave transmitted from the communication device is a threshold or more. This threshold may be a value generated by adding a margin to the radio field intensity required for reception. The communication range may be influenced by the weather conditions, hence the wireless communication apparatus may include a communication range calculation unit that is configured to calculate the communication range considering the weather conditions.

In this aspect, the position of the target object need not be acquired by the radar device alone, but may be acquired by other sensors or communication units. Examples of such a sensor are a stereo camera and a time-of-flight (TCF) type distance sensor. The position information may be acquired by a communication device using a frequency band that is different from the radar device. Examples of such a communication device are communication devices using dedicated short range communication (DSRC) and wireless LAN.

The wireless communication apparatus may be a movable wireless communication apparatus, and may include, for example, a wireless communication apparatus installed in such a movable body as a vehicle, and a portable wireless communication apparatus.

The present invention can be regarded as a wireless communication apparatus which includes at least a part of the above mentioned units. The present invention can also be regarded as a wireless communication method for executing at least a part of the above mentioned processing. Further, the present invention may be regarded as a computer program for causing a computer to execute this method, or a non-transitory computer-readable storage medium storing this computer program. Each of the above mentioned units and processing can be combined as much as possible to constitute the present invention.

According to the above aspect of the invention, a communication connection can be appropriately established and maintained when the wireless communication is performed using the same frequency band as the radar device.

Further aspects of the present disclosure will become apparent from the following description of exemplary embodiments with reference to the attached drawings.

BRIEF DESCRIPTION OF THE DRAWINGS

FIG. 6 is a flow chart depicting an operation example of the wireless communication apparatus according to an embodiment.

DESCRIPTION OF THE EMBODIMENTS

<Communication-Integrated Radar Device>

A wireless communication apparatus installed on a vehicle according to this embodiment uses a radar device which can execute both radar detection and wireless communication. In this disclosure, this type of radar device will be called a "communication-integrated radar device". The communication-integrated radar device can also be called a "joint radar sensing and communication device". The communication-integrated radar device executes processing in two modes: radar detection mode and wireless communication mode. These two modes may be implemented by a time-division method or a frequency-division method.

The radar detection mode is a mode in which the radar device operates as an FMCW radar, which transmits frequency modulated radar waves, receives reflected waves from the target object, and detects the distance to the target object and relative speed based on the beat signals in which the transmission/reception signals are mixed.

The wireless communication mode is a mode in which the radar device operates as a passive communicator, which transmits unmodulated radar waves (carrier waves), receives returned waves from a target device which received the radar waves, and demodulates the received signals, so as to acquire information from the target device.

Figure 1:
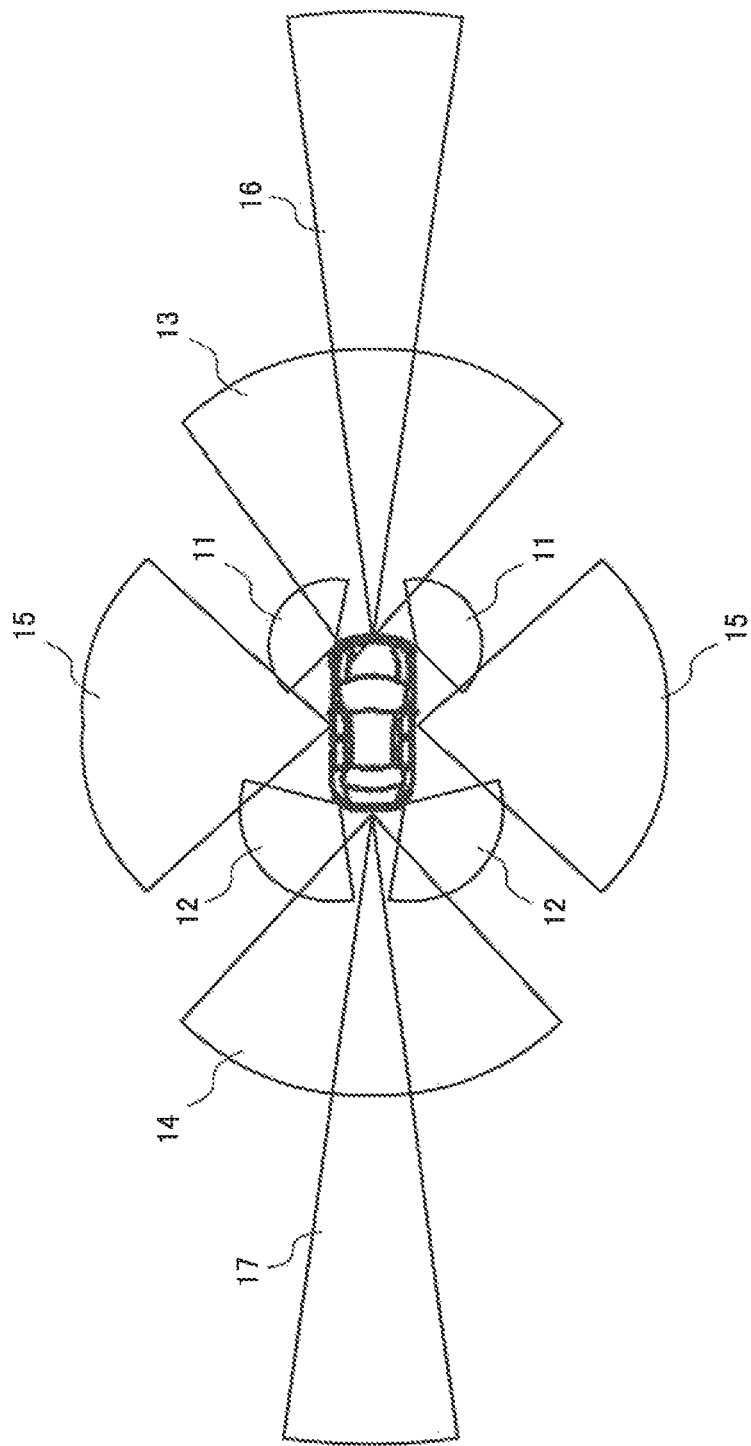
FIG. 1 is a diagram depicting, a communication-integrated radar device included in the wireless communication apparatus according to an embodiment.

FIG. 1 is a diagram depicting a type of communication-integrated radar device included in a vehicle according to this embodiment. The vehicle according to this embodiment has a plurality of communication-integrated radar devices 11 to 17 in accordance with the intended use. FIG. 1 illustrates the detection range (communication range) of each radar. The radar devices 11 and 12 have a detection range of an extremely short distance (up to 5 m) for dead angle monitoring. The radar devices 13 to 15 have a detection range of an intermediate distance (up to 30 m) for collision detection. The radar devices 16 and 17 have a detection range of a long distance (about 150 m) mainly for adaptive cruise control (ACC). Each radar device operates in a frequency band in accordance with the intended use. For example, the radar devices 16 and 17 for long distance use the 76 GHz or 79 GHz frequency hand, and the other radar devices use the 24 GHz frequency band.

Figure 2:
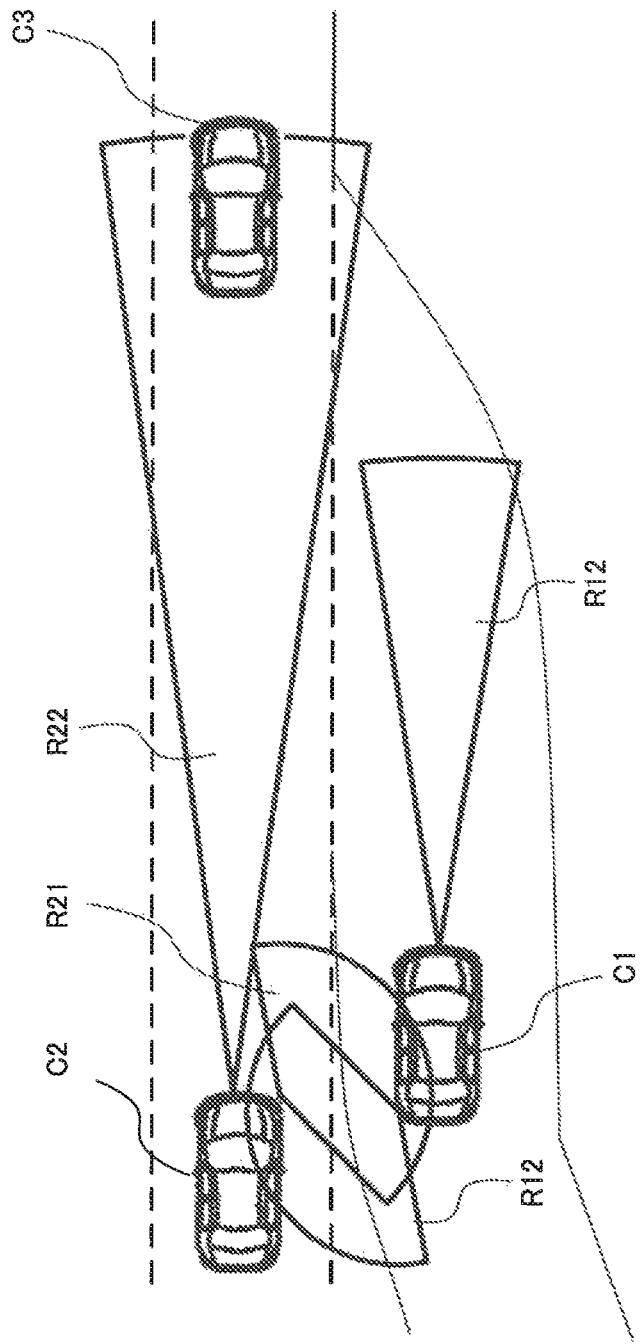
FIG. 2 is a diagram depicting an example of a communication scenario according to an embodiment.

The communication-integrated radar device uses high frequencies, therefore a large volume of data can be transmitted in a short time in the wireless communication mode. This means that the communication-integrated radar device is suitable for usage which requires the transmittance of large volumes of data in a short time, as in the case of vehicular communication. FIG. 2 illustrates a traffic merging scenario on a highway, one of the possible scenarios where the communication-integrated radar device is used. A vehicle C1, which is traveling in the acceleration lane, may notify a vehicle C2 traveling in the main lane of its intention to merge, using the radar device R12. The vehicle C1 and the vehicle C2 may communicate with each other using the radar devices R12 and R21, and adjust their trajectories. For example, the vehicle C2 may decelerate and prompt the vehicle C1 to proceed with merging. In this case, the vehicle C2 may also transmit information on a forward vehicle C3, which is detected by the forward radar device R22, to the vehicle C1. The forward vehicle C3 cannot be detected by the forward radar device R12 of the vehicle C1, hence the "field of view" of the vehicle C1 can be expanded by notification from the vehicle C2.

When this kind of communication is performed, it may be necessary to dynamically determine which specific communication-integrated radar device is used at each point in time, and establish a link between vehicles. The major task of the communication-integrated radar device is radar detection, which means that the communication must be performed without interrupting the radar detection. Therefore the vehicle in this embodiment should track a position of the communication partner vehicle (peer node), and determine (1) which radar device to use for the wireless communication, (2) when to start the wireless communication, and (3) how long perform the wireless communication.

<Configuration>

The wireless communication apparatus 100 included in the vehicle according to this embodiment will be described in detail. In the following description, both the wireless communication apparatus 100 itself and the vehicle which includes the wireless communication apparatus 100 may be referred to as "vehicle 100" without making any distinctions.

Figure 3:
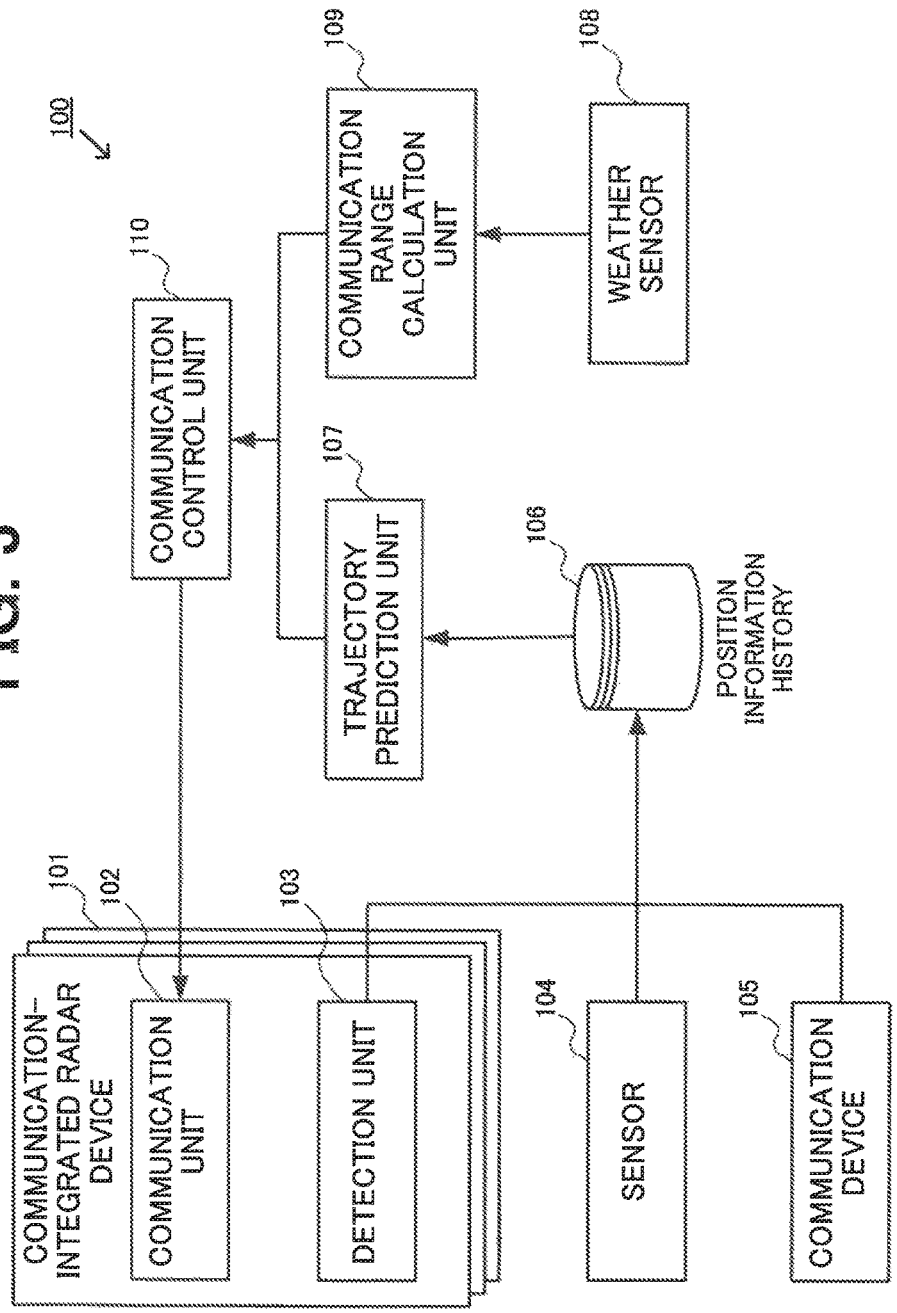
FIG. 3 is a block diagram depicting a configuration of the wireless communication apparatus according to an embodiment.

FIG. 3 is a diagram depicting a functional configuration of the wireless communication apparatus 100 according to this embodiment. The wireless communication apparatus 100 includes a set of communication-integrated radar devices 101, a sensor 104, a communication device 105, a storage unit 106, a trajectory prediction unit 107, a weather sensor 108, a communication range calculation unit 109, and a communication control unit 110. The trajectory prediction unit 107, the communication range calculation unit 109 and the communication control unit 110 may be constituted by such a logic circuit as field programmable gate array (FPGA), or may be constituted by a combination of a general purpose microprocessor and a software program.

As mentioned above, the vehicle 100 includes a plurality of communication-integrated radar devices 101. The communication-integrated radar device 101 is capable of performing both the wireless communication and the radar detection using one frequency band. The communication-integrated radar device 101 includes a communication unit 102 and a detection unit 103, by which the wireless communication and the radar detection are performed respectively.

The communication unit 102 transmits unmodulated carrier waves, receives returned waves from the communication partner, demodulates the received signals, and acquires information from the communication partner. Alternatively, the communication unit 102 may modulates the carrier waves using the transmission information, and transmits the modulated waves.

The detection unit 103 transmits frequency-modulated radar waves, receives reflected waves from the target object, and detects the distance to the target object and relative speed based on the beat signals in which transmission/reception signals are mixed. The detection unit 103 may detect target objects in a wide range by scanning in the transmission direction of the radar waves.

The sensor 104 is a sensor for detecting vehicles in peripheral areas, and the sensor 104 may, for example, be a camera (monocular camera, stereo camera), or a distance sensor (phase difference type, TOF type). The sensor 104 may be a radar device without communication functions, such as a millimeter wave radar, infrared laser radar (Light Detection and Ranging (LIDAR)) or an ultrasonic radar.

The communication device 105 performs wireless communication with communication devices in peripheral areas, including neighboring vehicles. The communication system of the communication device 105 is not limited to a particular type, and may be dedicated short range communication (DSRC) or wireless LAN, for example. Using the communication device 105, the vehicle 100 regularly transmits the position and speed of the vehicle to the neighboring vehicles. Further, using the communication device 105, the vehicle 100 also receives information on the position and speed transmitted from the neighboring vehicles.

The vehicle 100 also includes a satellite positioning apparatus (position information acquirer), such as global positioning system (GPS), to acquire positional information of this vehicle, and a vehicular sensor (vehicular information acquirer) to acquire information on the vehicle state (neither illustrated).

The storage unit 106 stores history on a position and vehicle speed of a neighboring vehicle acquired from the communication-integrated radar device 101, the sensor 104 and the communication device 105. The trajectory prediction unit 107 predicts the trajectory of a neighboring vehicle using the information on the position and speed of the neighboring vehicle stored in the storage unit 106. The trajectory prediction unit 107 may predict the trajectory using other information (e.g. expected travel route) acquired from the neighboring vehicle via communication.

The weather sensor 108 is a sensor to detect the weather conditions, such as rain and snow (precipitation sensor). By the weather sensor 108, the presence of rain, snow, hail or amounts thereof can be detected.

The communication range calculation unit 109 determines the communication range of the communication-integrated radar device 101 considering the weather conditions. Based on the communication range of the communication-integrated radar device 101 and the expected trajectory of the neighboring vehicle, the communication control unit 110 may determine which communication-integrated radar device 101 is used, and when communication with this neighboring vehicle is performed. Using this determined radar device at the determined timing, the communication control unit 110 establishes the wireless connection with the neighboring vehicle via the communication unit 102 of this communication-integrated radar device 101, and transmits/receives information.

Details on the processing by the trajectory prediction unit 107, the communication range calculation unit 109 and the communication control unit 110 will be described later.

<Communication Control Processing>

Figure 4:
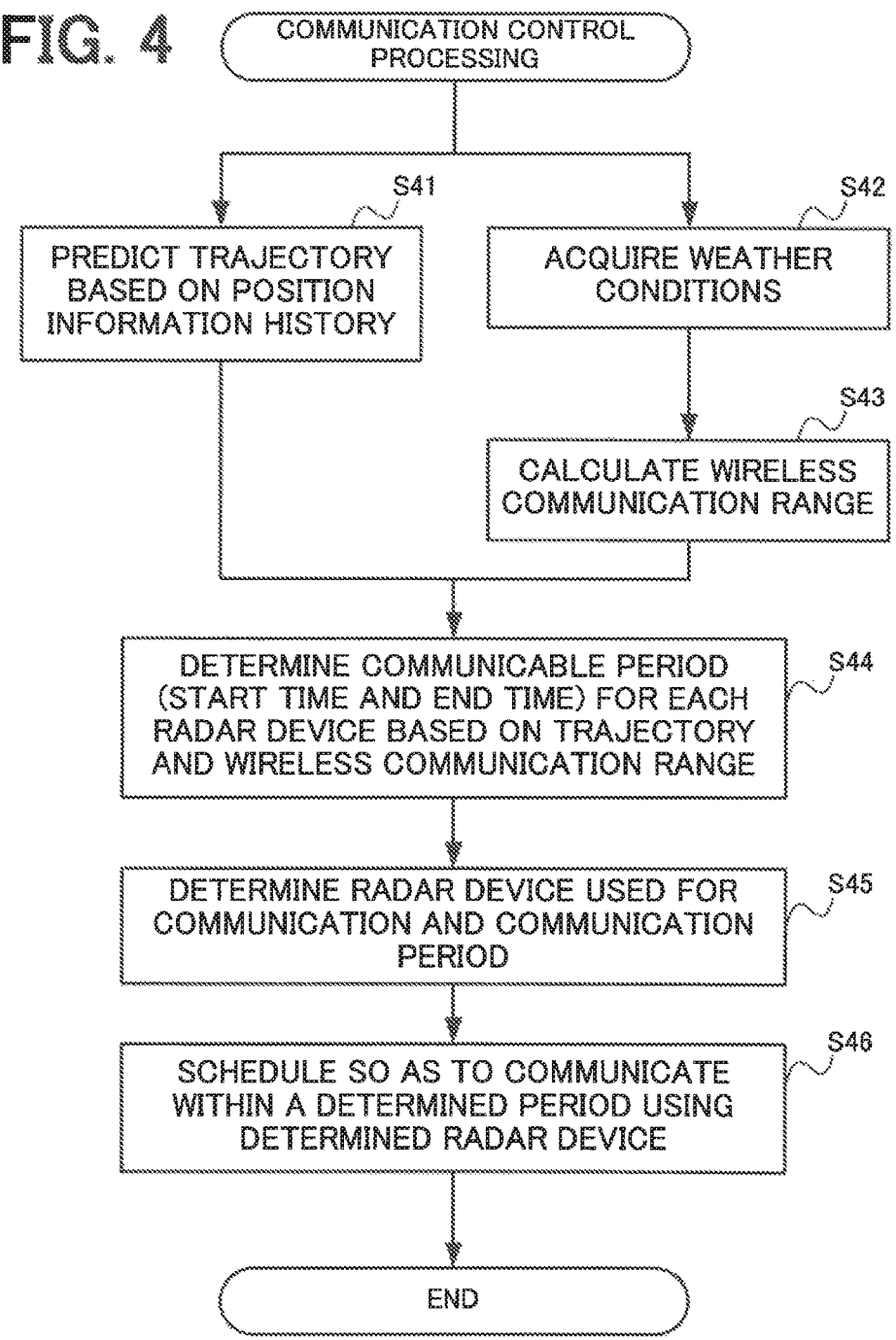
FIG. 4 is a flow chart depicting a flow of the communication control processing according to an embodiment.

FIG. 4 is a flow chart depicting the flow of the communication control processing according to this embodiment. This processing is for establishing and maintaining the wireless connection (link) using the communication-integrated radar device 101 in a situation where the communication partner vehicle is specified. The flowchart in FIG. 4 is an example of the processing, and the sequence and content of the processing may differ if a similar effect can be implemented.

In step S41, the trajectory prediction unit 107 predicts the trajectory of the communication partner vehicle using the information on the position and vehicle speed stored in the storage unit 106. Algorithm for the trajectory prediction may be a Kalman filter, a particle filter and regressive processing to approximate a curved line (e.g. least square method) or the like. If information on the future operation of the communication partner vehicle (e.g. notice of lane change) can also be received by communication via the communication-integrated radar device 101 or the communication device 105, the trajectory of the communication partner vehicle may be predicted considering this information.

In step S42, the weather sensor 108 acquires the current weather conditions. The weather sensor 108 acquires information on the presence of rain or snow or the amount thereof, for example.

Figure 5:
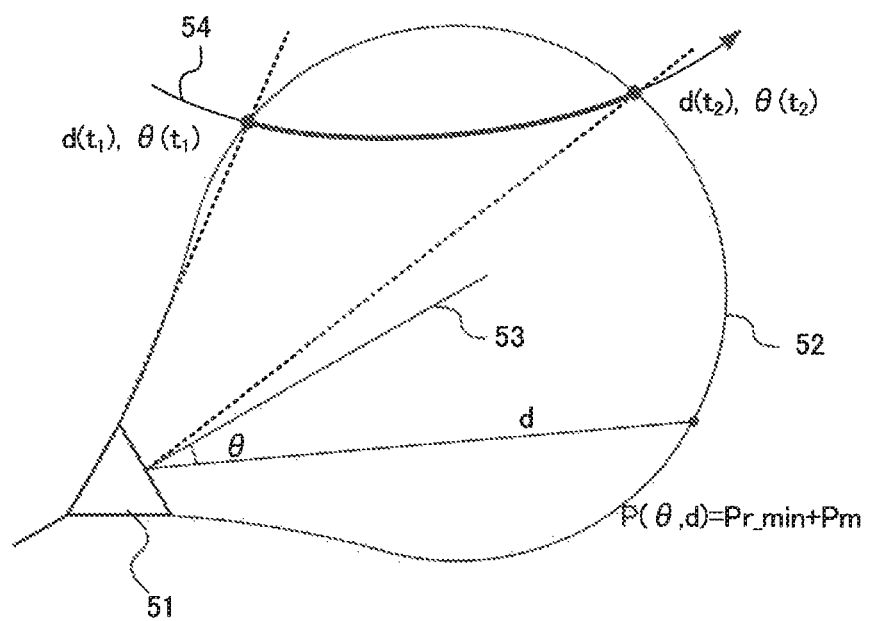
FIG. 5 is a diagram depicting a communicability determination processing based on the communication range and predicted trajectory according to an embodiment.

In step S43, the communication range calculation unit 109 calculates the communication range of each communication-integrated radar device 101. FIG. 5 is a diagram depicting the communication range 52 of the communication-integrated radar device 51. The reception power P of the transmission radio wave of the communication-integrated radar device 51 is determined as follows, as a function of the distance d from the antenna and the angle θ from the transmitting direction 53.

$$P(d, \theta) = P_t + G_a(\theta) - \left[\frac{\lambda}{4\pi d}\right]^2 - P_w(d)$$

Here $P_t$ denotes transmission power, $G_a$ denotes a transmission antenna pattern, $P_w$ denotes a propagation loss due to weather conditions, and λ, denotes a wavelength of a carrier wave. Here free space propagation loss is assumed. The transmission power $P_t$, the transmission antenna pattern $G_a$, and the propagation loss $P_w$ in accordance with the weather conditions, can be known in advance. For the propagation loss $P_w$, a loss in accordance with the precipitation and carrier wave length (e.g. when precipitation is 25 mm/h, propagation loss is 5 dB/km at 24 GHz, and 12 dB/km at 80 GHz) is stored in advance, and calculated using this data.

The communication range 52 can be expressed as follows, where $P_{r\_min}$ denotes minimum reception power, and $P_m$, denotes a power margin.

$$P(d,\theta) \geq P_{r\_min} + P_m$$

In step S44, the communication control unit 110 determines a communicable period with the communication partner vehicle for each communication-integrated radar device 101 based on the trajectory of the communication partner vehicle determined in step S41, and the communication range of the communication-integrated radar device 101 determined in step S43.

Both this vehicle and the communication partner vehicle constantly exchange their respective positions. Therefore when the trajectories of this vehicle and the communication partner vehicle are determined by absolute coordinates, the trajectory of the communication partner vehicle is converted into the coordinate system based on this vehicle. Further, if the communication-integrated radar device 101 changes its transmission direction, this aspect must be considered as well. In the following description, it is assumed that the communication partner vehicle is predicted to move along the trajectory 54 when viewed in the coordinate system based on this vehicle.

The communication control unit 110 can determine whether communication is currently possible or not based on the communication range 52 of the communication-integrated radar device 101 and the position of the communication partner vehicle. If the communication partner vehicle is located within the communication range 52, it can be determined how long communication is possible based on this predicted trajectory 54. If the communication partner vehicle is not located within the communication range 52, it can be determined whether communication becomes possible hereafter, and if possible, the communicable period can be determined.

The timing when communication with the communication partner vehicle is enabled and the timing when this communication is disabled can be determined using the following expression when the position of the communication partner vehicle at time t is expressed using the distance d (t) and the azimuth θ (t) from this vehicle.

$$P(d(t),\theta(t)) = P_{r\_min} + P_m$$

In the example in FIG. 5, time $t_1$ is a start time when communication is enabled, time $t_2$ is an end time when communication is disabled, and the communicable period is calculated as a period between time t and time $t_2$.

In step S45, the communication control unit 110 determines which communication-integrated radar device 101 is used, and when wireless communication is performed with the communication partner vehicle, based on the result in step S44. Here the selection standard is not especially limited, but the communication-integrated radar device 101 to be used and the communication period may be determined such that the required communication can be completed in the quickest way. If the required communication is not completed in one encountering period (period when the trajectory of the communication partner vehicle is within the communication range), the communication period may be determined such that the communication is performed using a plurality of encountering periods. The communication may be determined using a plurality of communication-integrated radar devices 101 simultaneously.

In step S46, the communication control unit 110 schedules the communication such that the communication is performed using the selected (communication unit 102 of) the communication-integrated radar device 101 during the communication period determined in step S45.

Operation Example

FIG. 6 is a flow chart depicting an example of the communication operation using the wireless communication device apparatus according to this embodiment. In step S61, the communication control unit 110 stands by until a data transmission request is received from a higher layer. In the data transmission request, the communication partner vehicle is specified by the position of the communication partner vehicle. The position of the communication partner vehicle can be acquired by detection using the radar device, or by notification via the communication device.

In step S62, it is determined whether the communication partner vehicle is located within the communication range. If the communication partner vehicle is located within the communication range (YES in S62), processing advances to step 363, and the communication unit 102 of the communication-integrated radar device 101 transmits the data. Whether the data transmission succeeded or not is determined in step S64, and processing advances to step S61 if the data transmission succeeded, and to step S62 if the data transmission failed.

The state where the determination result is YES in step S62 corresponds to the state where communication can be performed immediately in the processing illustrated in the flow chart in FIG. 4.

If it is determined that the communication partner vehicle is not located within the communication range in the determination processing in step S62 (NO in S62), processing advances to step S65. In step S65, processing to track the communication partner vehicle continues. In other words, detection of the position and vehicle speed of the communication partner vehicle and the prediction of the trajectory are executed. In step S66, it is determined whether the communication partner vehicle is moving away or not. If the communication partner vehicle is moving away (YES in S66), processing advances to step S67, where data is discarded and processing returns to step S61. If the communication partner vehicle is not moving away (NO in S66), processing returns to step S62.

The state where it is determined that the communication partner vehicle is moving away from this vehicle (YES in S66) corresponds to a case when it is determined that the communication partner vehicle does not enter the communication range of this vehicle in the processing of the flow chart in FIG. 4 (including the case when the communication partner vehicle enters the communication range, but the period required for communication cannot be satisfied). The state where it is determined that the communication partner vehicle is not moving away from this vehicle (NO in S66)

corresponds to a case when it is determined that the communication partner vehicle enters the communication range of this vehicle in the processing of the flow chart in FIG. 4.

Advantageous Effect of this Embodiment

According to this embodiment, in the communication using the communication-integrated radar device 101, connection via a wireless link can be appropriately established and maintained. Particularly, because of the use of the communication-integrated radar, the position of the neighboring vehicle can be acquired by radar detection, and the wireless link can be established and maintained based on this information. As described above, if the communication-integrated radar is used, the above mentioned communication processing can be implemented even without other sensors and communication devices. However, as described in this embodiment, it is more preferable to use sensors and communication devices other than the communication-integrated radar, since more accurate wireless communication can be implemented.

<Modification>

In the above description on the embodiment, the communication-integrated radar device, that is, a radar device which can perform both radar detection and wireless communication, is used as an example, but it is not always necessary to use the communication-integrated radar device. In other words, the present invention may be carried out as a wireless communication apparatus which includes a radar device (e.g. millimeter wave radar device) and a communication device which uses the same radio frequency as this radar device respectively. The present invention may also be carried out as a wireless communication apparatus which includes a communication-integrated radar device, a radar device which does not include the communication functions, and a communication device which does not include detection functions respectively.

In the above description, a plurality of communication-integrated radar devices exists, and it is determined which communication-integrated radar device is used, and when the wireless link is established. However, the above-described method can also be applied to a wireless communication apparatus which includes only one communication-integrated radar device. In this case, the above-described process can determine a timing when the wireless link is established.

In the above description of the embodiment, it is determined that communication is possible if the communication partner device exists within the communication range of this vehicle, without considering the orientation of the communication partner vehicle, that is, the directivity of the antenna. However, if information on the orientation of the communication partner vehicle and the directivity of the antenna (reception possible range) is available, it is preferable to determine whether communication is possible, considering this information as well. Then whether the wireless link can be connected can be determined more accurately.

In the above embodiment, the wireless communication apparatus is installed on an automobile, but the wireless communication apparatus may be installed on a movable body other than an automobile, or may be used in a fixed position.

The present invention may be appropriately modified and carried out within the scope of the technical ideas thereof.

What is claimed is:

1. A wireless communication apparatus comprising:
a radar device;
a communication device configured to communicate using at least a part of a frequency band that is used by the radar device;
an acquirer configured to acquire a position of a target object using the radar device;
a predictor configured to predict a trajectory of the target object from history of positions of the target object;
a controller configured to determine a communication start time with the target object based on a communication range of the communication device and the trajectory of the target object, and control the communication device so that data is transmitted to the target object at the determined communication start time using the communication device; and
a plurality of communication devices having different communication ranges from one another,
wherein the controller is further configured to determine a communication device used for communication and a communication start time based on the communication ranges of the plurality of communication devices and the trajectory of the target object, and control the communication devices so that data is transmitted to the target object at the determined communication start time using the determined communication device.

2. The wireless communication apparatus according to claim 1, wherein the controller is further configured to determine a communication end time based on the communication range and the trajectory.

3. The wireless communication apparatus according to claim 1, further comprising:
a second acquirer configured to acquire weather conditions; and
a calculator configured to calculate a communication range of the communication device using the acquired weather conditions.

4. The wireless communication apparatus according to claim 1, wherein the acquirer is further configured to acquire a position of the target object from a sensor or from a communication unit other than the radar device as well.

5. The wireless communication apparatus according to claim 1, wherein the radar device and the communication device are configured as an integrated device, which is configured to transmit information with superimposing the information on a signal for radar detection.

6. A wireless communication method for a wireless communication apparatus which includes a radar device, and a communication device configured to communicate using at least a part of a frequency band that is used by the radar device, comprising:
an acquiring step of acquiring a position of a target object using the radar device;
a predicting step of predicting a trajectory of the target object from history of positions of the target object; and
a controlling step of determining the communication start time with the target object based on the communication range of the communication device and the trajectory of the target object, and controlling the communication device so that data is transmitted to the target object at the determined communication start time using the communication device, the controlling step further including:
a step of determining a communication device used for communication and a communication start time based on communication ranges of a plurality of communication devices and the trajectory of the target object; and a step of transmitting data to the target object at the determined communication start time using the determined communication device.

7. The wireless communication method according to claim 6, wherein the controlling step further includes a step of determining a communication end time based on the communication range and the trajectory.

8. The wireless communication method according to claim 6, further comprising:
a step of acquiring weather conditions; and
a step of calculating a communication range of the communication device using the acquired weather conditions.

9. The wireless communication method according to claim 6, wherein the acquiring step further includes a step of acquiring a position of the target object from a sensor or a communication unit other than the radar device as well.

10. The wireless communication method according to claim 6,
wherein the radar device and the communication device are configured as an integrated device, and
wherein the controlling step further includes a step of transmitting information with superimposing the information on a signal for radar detection.

11. A non-transitory computer-readable storage medium storing a computer program for causing a computer to execute each step of the method according to claim 6.

* * * * *